(12) United States Patent
Zomerdijk et al.

(10) Patent No.: US 11,825,855 B2
(45) Date of Patent: Nov. 28, 2023

(54) PROCESSING LINE AND METHOD FOR HARVESTING HEARTS FROM VISCERA PACKAGES TAKEN OUT AND DETACHED FROM POULTRY CARCASSES

(71) Applicant: Meyn Food Processing Technology B.V., Oostzaan (NL)

(72) Inventors: Hermanus Laurentius Zomerdijk, Oostzaan (NL); Evert Kikstra, Oostzaan (NL); Derek Raymond Dil, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 57 days.

(21) Appl. No.: 17/533,051

(22) Filed: Nov. 22, 2021

(65) Prior Publication Data

US 2022/0159979 A1    May 26, 2022

(30) Foreign Application Priority Data

Nov. 26, 2020   (NL) ..................... 2026986

(51) Int. Cl.
  *A22C 17/00*  (2006.01)
  *A22C 17/14*  (2006.01)
  *A22C 21/00*  (2006.01)

(52) U.S. Cl.
  CPC .......... *A22C 17/14* (2013.01); *A22C 21/0053* (2013.01)

(58) Field of Classification Search
  CPC ............................ A22C 17/14; A22C 21/0053
  USPC ....................................................... 452/106
  See application file for complete search history.

(56) References Cited

U.S. PATENT DOCUMENTS

| 5,152,715 A * | 10/1992 | van de Eerden ...... A22C 17/14 |
| | | 452/120 |
| 5,186,678 A * | 2/1993 | Conner .................. A22C 21/06 |
| | | 452/106 |
| 9,491,952 B2 * | 11/2016 | Thrane .................. A22C 21/06 |
| 9,648,887 B2 * | 5/2017 | Thrane .................. A22B 5/0005 |
| 2003/0148725 A1 * | 8/2003 | Jensen .................. A22C 17/14 |
| | | 452/117 |
| 2020/0054030 A1 * | 2/2020 | Zomerdijk ............. A22C 17/14 |

FOREIGN PATENT DOCUMENTS

| EP | 0439904 A1 | 8/1991 |
| EP | 0679336 A1 | 11/1995 |
| WO | WO2015/070880 A1 | 5/2015 |

OTHER PUBLICATIONS

Search Report for NL Patent Application No. 2026986 dated Aug. 12, 2021 (3 pages).

* cited by examiner

*Primary Examiner* — Richard T Price, Jr.
(74) *Attorney, Agent, or Firm* — Dority & Manning, P.A.

(57) ABSTRACT

A processing line for harvesting hearts from viscera packages taken out from poultry carcasses. An apparatus with an infeed section below a conveying track to mechanically grip the viscera package. The infeed section is equipped to transfer the viscera package from which the gizzard is removed to a processing section. An outfeed section that follows the processing section, which outfeed section is arranged to make the heart as separated from the viscera package available at an outlet for the heart.

15 Claims, 3 Drawing Sheets

PROCESSING LINE AND METHOD FOR HARVESTING HEARTS FROM VISCERA PACKAGES TAKEN OUT AND DETACHED FROM POULTRY CARCASSES

PRIORITY STATEMENT

The present application claims priority under 35 U.S.C. § 119 to Dutch patent application No. 2026986, filed on Nov. 26, 2020.

FIELD OF THE INVENTION

The present subject matter relates to a processing line for harvesting hearts from viscera packages.

BACKGROUND OF THE INVENTION

EP 0 679 336 discloses a processing line for separating the entrails package removed from a slaughtered bird into parts, where the package include a gizzard, proventriculus, heart, lungs, liver, gallbladder and intestines. The processing line is equipped with a loosening means for loosening the direct connection between gizzard and intestines: a first separating means for separating the entrails package in a package that includes a liver, gallbladder and intestines on the one hand and a package that includes a gizzard, proventriculus, heart and lungs at the other hand: a second separating means for separating the liver from the gallbladder with giz zard and for separating the gizzard with proventriculus from the heart with lungs; and a transporting means for moving the package or parts thereof along the apparatus. A disadvantage of EP 0 679 336 is its limited suitability for high-speed processing of viscera packages taken out and detached from poultry carcasses to quickly harvest the hearts from the viscera packages and make them available to the processing line's user.

WO2015/070880 relates to a guide member to be used in a system for separating viscera sets eviscerated from slaughtered poultry. The system includes a viscera conveyor that includes a plurality of viscera holders, wherein each viscera holder is configured to hold a viscera set in a manner whereby at least the liver, the intestines, and the gallbladder are suspended below the viscera holder. The guide member includes an elongated opening and is configured to receive a viscera set, held by a viscera holder, in the elongated opening in a manner whereby the intestines and the gallbladder are suspended below the guide member and the liver and gizzard are positioned above the guide member; and wherein the system is configured to separate the intestines and the gallbladder from the remaining viscera set. In this arrangement the guide member is moveable, and the system is configured to separate the intestines and the gallbladder from the remaining viscera set while at least the liver rests on a separation support surface of the guide member. This document, although relating to the processing of viscera packages taken out and detached from poultry carcasses, does not relate to harvesting and separately discharging the heart from viscera packages and is therefore not relevant.

EP-A-0 439 904 discloses a method and apparatus for separation of the heart and liver from viscera packages taken out but still attached to slaughtered poultry. The apparatus is located alongside an overhead conveyor and includes a secondary conveyor which engages a portion of the gut extending from the viscera package which is still connected to the eviscerated bird. A pair of guide fingers define a channel for receiving the connective tissue attaching the heart to the liver, and a first rotary knife positioned alongside that channel severs the connective tissue. A second rotary knife severs the liver from the gall without cutting the gall or releasing the bile within. A pair of helical rollers separates the mutually connected heart and lungs. This known apparatus and method discloses that an operator is required to assist the operation of the apparatus by arranging that part of the gut must be placed over the secondary conveyor as the operator moves the viscera package to the position shown in FIG. 2 of EP-A-0 439 904. From the disclosure of EP-A-0 439 904 it is immediately evident that this technology is unsuited for high-speed processing of viscera packages, which at least requires that the viscera packages are taken out and detached from poultry carcasses, as a proper starting point to quickly harvest the hearts from the viscera, packages and make them available to the processing line's user.

BRIEF DESCRIPTION OF THE INVENTION

In one exemplary aspect, the invention can provide a processing line enabling high-speed processing of viscera packages taken out and completely detached from poultry carcasses. Manual intervention or operation by an operator becomes unnecessary, and wherein ac-cordingly processing can be performed fully automatically.

In one exemplary embodiment, the present invention relates to a processing line for harvesting hearts from viscera packages taken out and detached from poultry carcasses. The processing line may include a conveying track with movable carriers for conveying the viscera packages, which viscera packages at least a heart, lungs and a gizzard, and which processing line is equipped to separate the heart, the lungs and the gizzard from the viscera packages and to at least discharge the heart separately. The processing line of the invention can be embodied with the features of one or more of the appended claims.

In another exemplary aspect of the invention, the conveying track is equipped with carriers from which during use the viscera packages are suspended. The conveying track can be provided above an infeed section of an apparatus below the conveying track. The infeed section can be arranged to mechanically grip the viscera package and is detached and released from the poultry carcasses and suspended from one of the carriers. The infeed section can be further equipped to separate the gizzard from the viscera package and to transfer the viscera package from which the gizzard is removed to a processing section of the apparatus for separating the lungs from the heart. The apparatus can further include an outfeed section that follows the processing section, which outfeed section is arranged to make the heart, which is separated from the viscera package, available at an outlet for the heart.

In another exemplary aspect, the processing line of the invention can obviate the need for an operator to intervene or to participate in the method of processing the viscera package and harvesting of the heart from the viscera package. Moreover processing can be done with the processing line of the invention after complete detachment of the viscera package from the poultry carcasses, which promotes swift processing.

In another exemplary aspect, the infeed section can be arranged to cooperate with a carrier from the conveying track so as to operate on the viscera package while the viscera package is suspended from the carrier. This is beneficial for an effective separation of the gizzard from the viscera package.

Suitably the infeed section can include a first roller and a set of first plates, which together define a first nip to receive at least a part of the viscera package. The first roller can be arranged to move the viscera package in the conveying direction concurrent with the carrier from which the viscera package is suspended, while leaving the heart and lungs on tot) of the set of first plates.

The apparatus can be provided with a guide plate for the gizzard below the first roller and the set of first plates, which guide plate is downwards slanting in the conveying direction so as to completely detach the gizzard from the viscera package.

The carrier can be arranged to release the viscera package after removal of the gizzard to enable that the infeed section transfers the heart and lungs on top of the set of first plates to the processing section.

The processing section can include a selected one of an extension of the first roller or a second roller, as well as a second plate defining a second nip to catch the lungs and pull the lungs through the nip. In principle the heart is then available for supplying it to the outlet, although further operations may be required in case still (part of) the lungs attach to the heart.

The selected one of the extension of the first roller or the second roller can be provided with at least one rib at its outer circumference so as to promote pushing the heart and lungs against the second plate and to assist in pulling the lungs through the nip.

In order to promote an effective separation of the lungs from the heart, the second plate can be spring-loaded.

The separation of lungs from the heart can be further promoted by arranging that in the conveying direction at the end of the second roller and second plate, a pinch off block can be provided to sever the lungs from the heart.

Beneficially following the pinch off block, a set of cleaning rollers can be provided for removing any possibly remaining lungs from the heart.

Further preferably the outfeed section that follows the processing section includes a separation bath for separating any remaining lungs that have reached the outfeed section from the heart. In the separation bath the lungs and the heart may be separated based on their different density. The heavier heart sinks in the separation bath, whereas the lungs will float.

Suitably the separation bath can include the outlet which is provided at the bottom of the separation bath.

According to the above, the invention can also be embodied in a method for harvesting hearts from viscera packages taken out and detached from poultry carcasses, wherein each viscera package includes at least a heart, lungs and a gizzard. The method can include suspending the detached viscera packages from carriers and conveying the carriers with the suspended viscera packages in a conveying track; mechanically gripping each viscera package below the conveying track; and subsequently separating the gizzard from the viscera package, followed by transferring the viscera package from which the gizzard is removed to a processing section for separating the lungs from the heart, and making the heart as separated from the viscera package available at an outlet for the heart.

These and other objects and advantages are provided by an apparatus and method according to the invention which has the features of one or more of the appended claims.

BRIEF DESCRIPTION OF THE DRAWINGS

The invention will hereinafter be further elucidated with reference to the drawing of an exemplary embodiment of a processing line according to the invention that is not limiting as to the appended claims.

In the drawing.

Whenever in the figures the same reference numerals are applied, these numerals refer to the same parts.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 3:
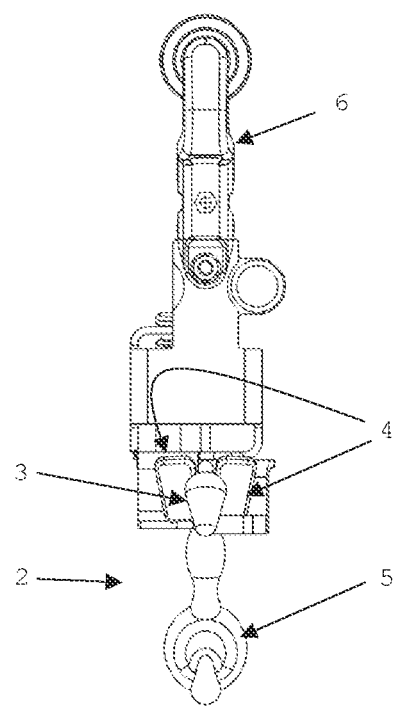
FIG. 3 shows in detail a carrier of the processing line of the invention with a detached viscera package suspended therefrom.

With first taking reference to FIG. 3, it shows a viscera package 2 taken out of and detached from a poultry carcass (not shown), and including a heart 3, lungs 4 and gizzard 5. The viscera package 2 is suspended from a carrier 6 as is also shown in FIG. 1, to be discussed as follows.

Figure 1:
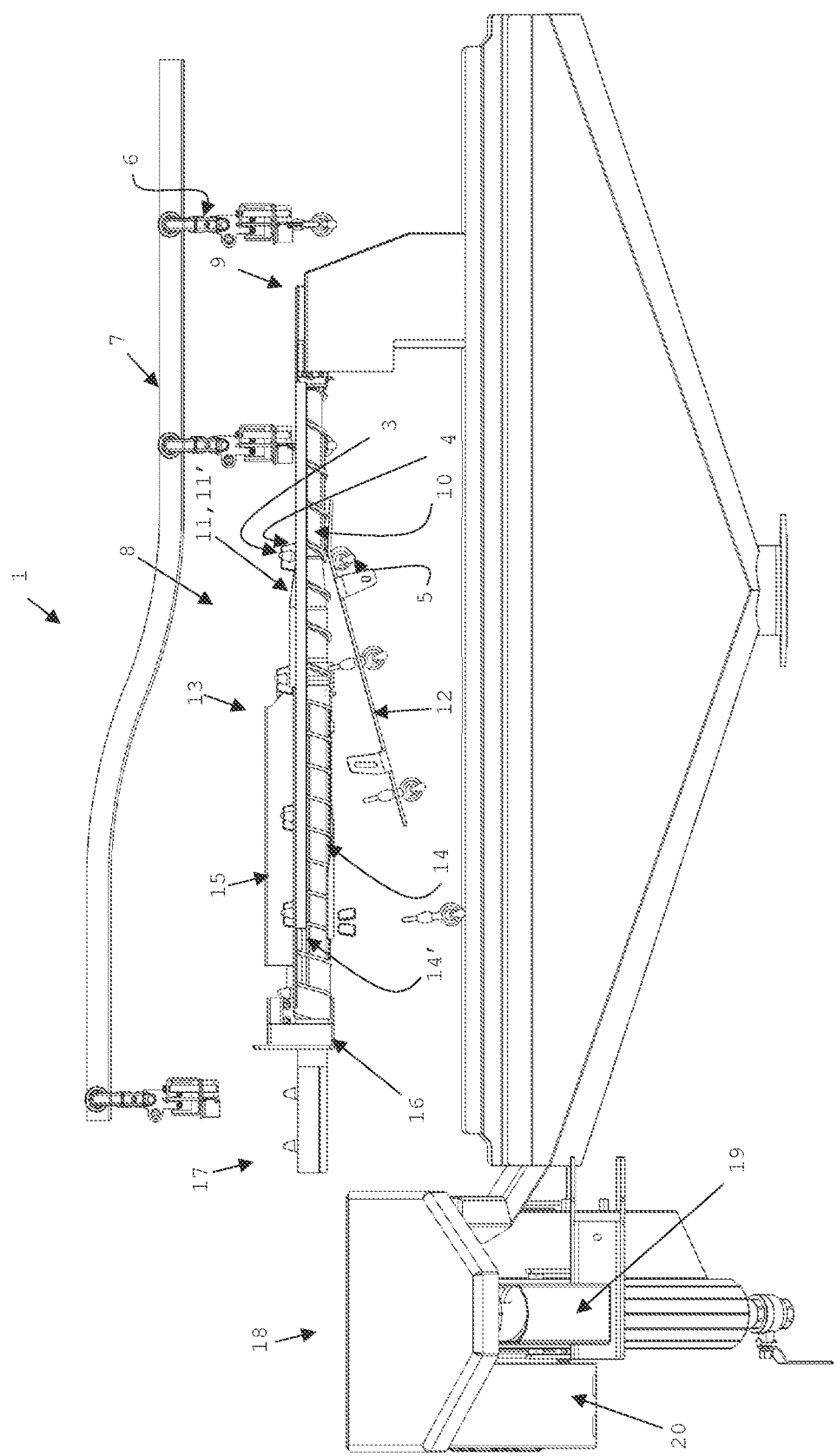
FIG. 1 shows a schematic side view of a processing line according to the in-vetion.
Figure 2:
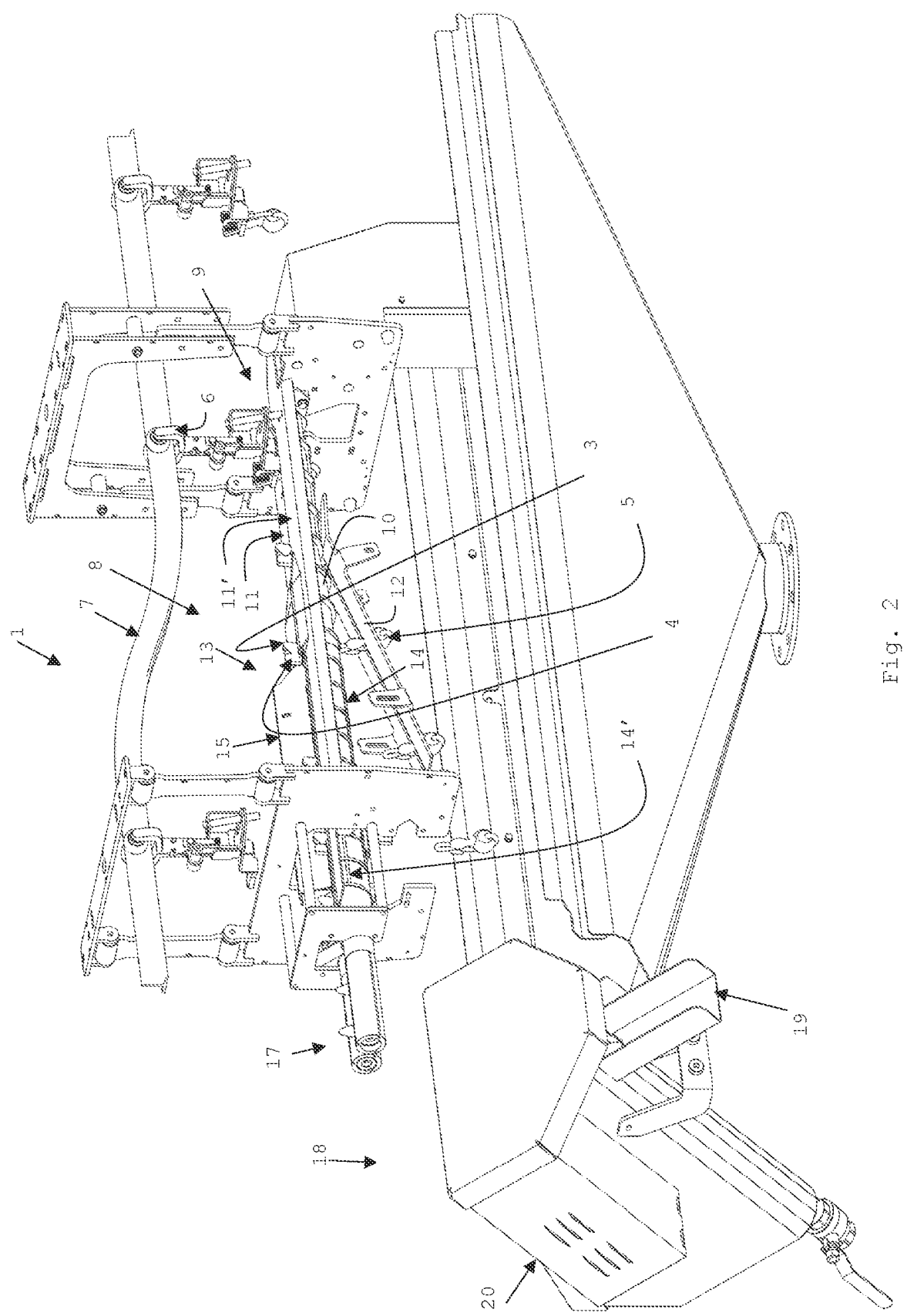
FIG. 2 shows the processing line of the invention in an isometric view.

FIG. 1 shows an exemplary embodiment of a processing line 1 for harvesting the mentioned hearts 3 from viscera packages 2 taken out from poultry carcasses. This exemplary processing line 1 includes a conveying track 7 with movable carriers 6 (only one carrier is shown) for conveying the viscera package(s) 2, which at least include a heart 3, lungs 4 and a gizzard 5. The viscera package 2 is completely detached from the poultry carcass from which it originates.

In use of the processing line 1 the viscera package 2 is suspended from the carrier 6, and the processing line 1 includes an apparatus 8 with an infeed section 9 below the conveying track 7 to operate on the viscera package 2 suspended from the carrier 6. For that purpose the infeed section 9 includes a first roller 10 and a set of plates 11, 11' which together define a first nip to receive at least a part of the viscera package 2, wherein the first roller 10 is arranged to move the viscera package 2 in the conveying direction concurrent with the carrier 6 from which the viscera package 2 is suspended, while leaving the heart 3 and lungs 4 on top of the set of plates 11, 11'. It is further shown that the infeed section 9 is arranged to subsequently separate the gizzard 5 from the viscera package 2. For that purpose the apparatus 8 is provided with a guide plate 12 for the gizzard 5 below the first roller 10 and first plate 11, which guide plate 12 is downwards slanting in the conveying direction so as to completely detach the gizzard 5 from the viscera package 2.

The infeed section 9 is further equipped to transfer the viscera package 2 from which the gizzard is removed subsequently to a processing section 13 of the apparatus 8 for separating the lungs 4 from the heart 3. To that end the carrier 6 is arranged to release the viscera package 2 after removal of the gizzard 5 to enable that the infeed section 9 can transfer the heart 3 and lungs 4 on top of the first set of plates 11, 11' to the processing section 13.

The processing section 13 includes a second roller 14 and a second plate 15 defining a second nip to catch the lungs 4 and pull the lungs 4 through the second nip. Instead of a second roller 14 it is also possible to apply an extension of the first roller 10 which then acts as the second roller. Typically the second roller 14 or the extension of the first roller 10 has a larger diameter than the first roller 10 at the location of the infeed section 9.

It is depicted in the Figures further that either the applied extension of the first roller 10 in the processing section 13, or the second roller 14 in this processing section 13 is provided with at least one rib 14' at its outer circumference so as to promote pushing the heart 3 and lungs 4 against the second plate 15 and to assist in pulling the lungs 4 through the nip. For this exemplary embodiment, it is further preferred for an effective separation of the lungs 4 from the heart 3 that the second plate 15 is spring-loaded urging the second plate 15 towards the second roller 14.

As seen in the conveying direction at the end of the second roller 14 and second plate 15, a pinch off block 16 is provided to sever the lungs 4 from the heart 3.

Following the pinch off block 16 a set of cleaning rollers 17 are provided for removing any remaining (parts of) lungs 4 from the heart 3.

This exemplary apparatus 8 further includes an outfeed section 18 that follows the processing section 13, which outfeed section 18 is arranged to make the heart 3 as separated from the viscera package 2 available at an outlet 19 for the heart 3. Suitably the outfeed section 18 that follows the processing section 13 includes a separation bath 20 for separating any remaining (parts of) lungs 4 that may have reached the outfeed section 18 from the heart. This separation bath 20 makes use of the different densities of the heart and the lungs. The heart sinks to the bottom of the separation bath 20, whereas the lungs will float. The separation bath 20 includes the outlet 19 for the heart which is provided at the bottom of the separation bath 20.

This exemplary apparatus of the invention 1 is thus tailored to execute a method for harvesting hearts 3 from viscera packages 2 taken out and detached from poultry carcasses, wherein each viscera package 2 at least includes a heart 3, lungs 4 and a gizzard 5, and suspending the detached viscera packages 2 from carriers 6 and conveying the carriers 6 with the suspended viscera packages 2 in a conveying track 7, wherein each viscera package 2 is mechanically gripped below the conveying track 7 and the gizzard 5 is subsequently separated from the viscera package 2, followed by transferring the viscera package 2 from which the gizzard is removed to a processing section 13 for separating the lungs 4 from the heart 3, and making the heart 3 as separated from the viscera package 2 available at an outlet 19 for the heart 3.

Although the invention has been discussed in the foregoing With reference to an exemplary embodiment of the processing line and method of the invention, the invention is not restricted to this particular embodiment which can be varied in many ways without departing from the invention. The discussed exemplary embodiment shall therefore not be used to con-strue the appended claims strictly in accordance therewith. On the contrary the embodiment is merely intended to explain the wording of the appended claims without intent to limit the claims to this exemplary embodiment. The scope of protection of the invention shall therefore be con-strued in accordance with the appended claims only, wherein a possible ambiguity in the wording of the claims shall be resolved using this exemplary embodiment.

The invention claimed is:

1. A processing line for harvesting hearts from viscera packages taken out and detached from poultry carcasses, the processing line comprising:
    a conveying track with movable carriers for conveying the viscera packages, which viscera packages at least include a heart, lungs, and a gizzard, and which processing line is equipped to separate the heart, the lungs, and the gizzard from the viscera packages and to at least discharge the heart separately, wherein the conveying track includes carriers from which during use the viscera packages are suspended;
    an apparatus having an infeed section below the conveying track, which infeed section is arranged to mechanically grip the viscera package which is detached and released from the poultry carcasses and suspended from one of the carriers, wherein the infeed section is further equipped to separate the gizzard from the viscera package and to transfer the viscera package from which the gizzard is removed to a processing section of the apparatus for separating the lungs from the heart;
    wherein the apparatus further includes an outfeed section that follows the processing section, which outfeed section is arranged to make the heart which is separated from the viscera package available at an outlet for the heart, and
    where the carrier is arranged to release the viscera package after removal of the gizzard to enable that the infeed section transfers the heart and lungs on top of the set of first plates to the processing section.

2. The processing line of claim 1, wherein the infeed section is arranged to cooperate with a carrier of the conveying track so as to operate on the viscera package while the viscera package is suspended from the carrier.

3. The processing line of claim 1, wherein the infeed section comprises
    a first roller and a set of first plates which together define a first nip to receive at least a part of the viscera package, wherein the first roller is arranged to move the viscera package in the conveying direction concurrent with the carrier from which the viscera package is suspended, while leaving the heart and lungs on top of the set of first plates.

4. The processing line of claim 3, where the apparatus further comprises a guide plate for the gizzard below the first roller and the set of first plates, the guide plate slanting downwards in the conveying direction so as to completely detach the gizzard from the viscera package.

5. The processing line of claim 1, wherein the processing section comprises one of the following: an extension of the first roller, a second roller, or a second plate defining a second nip to catch the lungs and pull the lungs through the nip.

6. The processing line according to claim 5, wherein the second plate is spring-loaded.

7. The processing line according to claim 5, wherein the processing section comprises a second roller, and wherein in the conveying direction at an end of the second roller a pinch off block is provided to sever the lungs from the heart.

8. The processing line according to claim 7, wherein following the pinch off block a set of cleaning rollers are provided for removing any remaining lungs from the heart.

9. The processing line according to claim 5, wherein the processing section comprises a second plate, and wherein in the conveying direction at an end of the second plate a pinch off block is provided to sever the lungs from the heart.

10. The processing line according to claim 1, wherein the processing section comprises a selected one of the following: an extension of the first roller or a second roller; and wherein the selected one of an extension of the first roller or a second roller is provided with at least one rib at its outer circumference so as to promote pushing the heart and lungs against the second plate and to assist in pulling the lungs through the nip.

11. The processing line according to claim 10, wherein the second plate is spring-loaded.

12. The processing line according to 1, wherein the outfeed section that follows the processing section comprises a separation bath for separating any remaining lungs that have reached the outfeed section from the heart.

13. The processing line according to claim 12, where the separation bath comprises the outlet which is provided at the bottom of the separation bath to collect the hearts.

14. A method for harvesting hearts from viscera packages taken out and detached from poultry carcasses, wherein each viscera package at least comprises a heart, lungs, and a gizzard, the method comprising
suspending the detached viscera packages from carriers;
conveying the carriers with the suspended viscera packages in a conveying track;
mechanically gripping each viscera package below the conveying track; and
separating the gizzard from the viscera package;
transferring the viscera package from which the gizzard is removed to a processing section for separating the lungs from the heart;
releasing the viscera package after removal of the gizzard; and
making the heart as separated from the viscera package available at an outlet for the heart.

15. A processing line for harvesting hearts from viscera packages taken out and detached from poultry carcasses, the processing line comprising:
a conveying track with movable carriers for conveying the viscera packages, which viscera packages at least include a heart, lungs, and a gizzard, and which processing line is equipped to separate the heart, the lungs, and the gizzard from the viscera packages and to at least discharge the heart separately, wherein the conveying track includes carriers from which during use the viscera packages are suspended;
an apparatus having an infeed section below the conveying track, which infeed section is arranged to mechanically grip the viscera package which is detached and released from the poultry carcasses and suspended from one of the carriers, wherein the infeed section is further equipped to separate the gizzard from the viscera package and to transfer the viscera package from which the gizzard is removed to a processing section of the apparatus for separating the lungs from the heart;
wherein the apparatus further includes an outfeed section that follows the processing section, which outfeed section is arranged to make the heart which is separated from the viscera package available at an outlet for the heart,
wherein the infeed section further includes a first roller and a set of first plates which together define a first nip to receive at least a part of the viscera package, wherein the first roller is arranged to move the viscera package in the conveying direction concurrent with the carrier from which the viscera package is suspended, while leaving the heart and lungs on top of the set of first plates; and
where the apparatus further comprises a guide plate for the gizzard below the first roller and the set of first plates, the guide plate slanting downwards in the conveying direction so as to completely detach the gizzard from the viscera package.

* * * * *